(12) United States Patent
Yamaguchi et al.

(10) Patent No.: US 9,464,565 B2
(45) Date of Patent: Oct. 11, 2016

(54) WASTEGATE VALVE AND EXHAUST GAS TURBOCHARGER EQUIPPED WITH WASTEGATE VALVE

(75) Inventors: Hideki Yamaguchi, Tokyo (JP); Hiroshi Nakagawa, Tokyo (JP); Yasuaki Jinnai, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/368,538

(22) PCT Filed: Dec. 27, 2011

(86) PCT No.: PCT/JP2011/007308
§ 371 (c)(1),
(2), (4) Date: Jul. 31, 2014

(87) PCT Pub. No.: WO2013/098884
PCT Pub. Date: Jul. 4, 2013

(65) Prior Publication Data
US 2014/0345273 A1    Nov. 27, 2014

(51) Int. Cl.
*F02D 23/00*    (2006.01)
*F02B 37/18*    (2006.01)
(Continued)

(52) U.S. Cl.
CPC .............. *F02B 37/186* (2013.01); *F01D 17/10* (2013.01); *F02B 37/183* (2013.01); *F02C 6/12* (2013.01); *F05D 2220/40* (2013.01); *Y02T 10/144* (2013.01)

(58) Field of Classification Search
CPC ...... F02B 37/186; F02B 37/183; F02C 6/12; F01D 17/10
USPC ................................... 60/602; 251/298, 302
See application file for complete search history.

(56) References Cited

U.S. PATENT DOCUMENTS 2,565,108 A * 8/1951 Zahodiakin ............. F16F 1/324
267/162
5,706,770 A * 1/1998 Schmidt .................. F01L 1/185
123/90.36
(Continued)

FOREIGN PATENT DOCUMENTS

CN    101105161 A    1/2008
DE    44 39 432 C1    11/1995
(Continued)

OTHER PUBLICATIONS

Translation, DE 102011075201 A1, Jan. 4, 2016, entire document.*
(Continued)

*Primary Examiner* — Nicholas J Weiss
*Assistant Examiner* — Jason T Newton
(74) *Attorney, Agent, or Firm* — Birch, Stewart, Kolasch & Birch, LLP

(57) ABSTRACT

A wastegate valve includes, a valving element 13 that opens and closes an exhaust gas bypass path, a valve stem 17 that extends from the valving element, an operating lever 15 having an insertion hole 29 where the valve stem is inserted with play, a support plate 31 provided on an open end of the valve stem, and a spring member 19 provided between the support plate and the operating lever 15. The spring member has a large-diameter part and at least two small-diameter parts, the large-diameter part and the at least two small-diameter parts being arranged concentrically with an axial center of the valve stem, and the at least two small-diameter parts constitute a first contact part 35 in contact with an operating lever side and a second contact part 37 in contact with a support plate side.

8 Claims, 5 Drawing Sheets

(51) Int. Cl.
  *F01D 17/10*    (2006.01)
  *F02C 6/12*     (2006.01)

(56) References Cited

U.S. PATENT DOCUMENTS

| | | | | |
|---|---|---|---|---|
| 6,427,969 | B1* | 8/2002 | Ho et al. | 251/85 |
| 8,365,882 | B2* | 2/2013 | Kirschner | F16D 65/12 |
| | | | | 188/218 XL |
| 8,707,582 | B2* | 4/2014 | Klassen | A43B 13/181 |
| | | | | 267/161 |
| 2005/0151310 | A1* | 7/2005 | Rodeffer | F16F 1/32 |
| | | | | 267/161 |
| 2008/0029073 | A1* | 2/2008 | Klipfel et al. | 123/568.11 |
| 2011/0037210 | A1* | 2/2011 | Rode | F16F 1/32 |
| | | | | 267/162 |
| 2012/0055154 | A1 | 3/2012 | Ebert | |
| 2012/0319020 | A1* | 12/2012 | Doehler et al. | 251/214 |
| 2013/0189072 | A1* | 7/2013 | Wade | 415/1 |
| 2014/0366530 | A1* | 12/2014 | Murayama | F02B 37/183 |
| | | | | 60/602 |
| 2014/0366531 | A1* | 12/2014 | Segawa | F02B 37/186 |
| | | | | 60/602 |
| 2015/0147162 | A1* | 5/2015 | Stilgenbauer | F01D 17/105 |
| | | | | 415/145 |

FOREIGN PATENT DOCUMENTS

| | | | | | |
|---|---|---|---|---|---|
| DE | | 4439432 | C1 * | 11/1995 | F01N 3/20 |
| DE | 10 2009 030 520 | A1 | | 1/2010 | |
| DE | 10 2010 043 147 | A1 | | 10/2011 | |
| DE | | 102010043147 | A1 * | 11/2011 | F02B 37/12 |
| DE | | 102011075201 | A1 * | 11/2012 | F02B 37/186 |
| DE | 10-2012-003-709 | A1 | | 8/2013 | |
| FR | | 928.052 | | 11/1947 | |
| JO | | 2005-226591 | A | 8/2005 | |
| JP | | 53-94330 | U | 8/1978 | |
| JP | | 59-52041 | U | 4/1984 | |
| JP | | 4-272430 | A | 9/1992 | |
| JP | | 7-19065 | A | 1/1995 | |
| JP | | 07019065 | A * | 1/1995 | F02B 37/18 |
| JP | | 8-233154 | A | 9/1996 | |
| JP | | 2002-54773 | A | 2/2002 | |
| JP | | 4254380 | B2 | 4/2009 | |
| JP | | 2011-242242 | A | 12/2011 | |
| JP | | 2012-527575 | A | 11/2012 | |
| WO | WO 2010/135104 | A2 | | 11/2010 | |

OTHER PUBLICATIONS

International Preliminary Report on Patentability and Written Opinion of the International Searching Authority (Forms PCT/IB/326, PCT/IB/373 and PCT/ISA/237) for International Application No. PCT/JP2011/007308, dated Jul. 10, 2014.
International Search Report and Written Opinion of the International Searching Authority (Forms PCT/ISA/220, PCT/ISA/210 and PCT/ISA/237) for International Application No. PCT/JP2011/007308, dated Oct. 5, 2012.
European Notice of Allowance, issued Sep. 17, 2015, for European Application No. 11808957.2.
Japanese Office Action, issued Oct. 2, 2015, for Japanese Application No. 2014-548342, along with an English translation.
Chinese Office Action and Search Report, dated Oct. 29, 2015, for Chinese Application No. 201180075919.1, together with an English translation.
Chinese Notice of Allowance, dated May 31, 2016, for Chinese Application No. 201180075919.1, together with an English translation thereof.
Japanese Decision to Grant a Patent, dated Jul. 29, 2016, for Japanese Application No. 2014-548342.

* cited by examiner

WASTEGATE VALVE AND EXHAUST GAS TURBOCHARGER EQUIPPED WITH WASTEGATE VALVE

TECHNICAL FIELD

The present invention relates to a wastegate valve and an exhaust gas turbocharger equipped with the wastegate valve.

BACKGROUND ART

In an exhaust gas turbocharger which compresses intake air for an engine, particularly an exhaust gas turbocharger for a vehicle engine, a wastegate valve is provided to prevent a supercharging pressure of the intake air from increasing excessively due to increasing pressure of the exhaust gas. The wastegate valve is configured such that the exhaust gas is partially diverted from an inlet side of an exhaust gas path of the turbine housing into an exhaust gas outlet path via an exhaust gas bypass path which is opened and closed by the wastegate valve so as to reduce energy of the exhaust gas supplied to the turbine rotor.

A conventional wastegate valve for an exhaust gas turbocharger is disclosed in Patent Literature 1 and Patent Literature 2.

In the disclosure of Patent Document 1, as shown in FIG. 11, a valving element 02 attached to a tip of an operating lever 01 is moved by turning the operating lever 01 to open and close a path. Further, in Patent Literature 1, a valve stem 03 of the valving element 02 is inserted in an insertion hole 04 of the operating lever 01 and a groove 06 with a whirl stopper face 05 is formed in an opening part of the insertion hole 04 of the operating lever 01. In the groove 06, a whirl stopper washer 07 is fitted such that a lateral face thereof is in contact with the whirl stopper face 05. The washer 07 is fixed to the valve stem 03 by caulking or welding.

In the disclosure of Patent Literature 2, a disc spring 011 shown in FIG. 12A is provided between a valving element and a lever 013, and the disc spring shown in FIG. 12B is provided between the lever 013 and a plate provided on the opposite side of the valving element 012 so as to apply force against the valving element 012. Thus, the valving element 012 is attached to the lever 013 such as to absorb vibration of the valving element 012.

CITATION LIST

Patent Literature

PTL 1: JP-A-7-19065
PTL 2: WO-A-2010/135104

SUMMARY OF INVENTION

Technical Problem

In the wastegate valve of Patent Literature 1, the valve stem 03 is fixed to the operating lever 01 via the whirl stopper washer 07 as shown in FIG. 11. Thus, the valving element 02 does not turn around about an axial center of the valve stem 03 or swing with respect to the operating lever 01. Therefore, when the operating lever 01 moves to open or close the valve, the valving element 02 tends to make partial contact with the valve seat, resulting in uneven seating of the valving element on the valve seat.

In the wastegate valve of Patent Literature 2, the valving element 012 is inserted in the insertion hole 015 with clearance in the axial direction and in the radial direction as shown in FIG. 12. Thus, the valving element 012 can swing (in a direction of M in FIG. 12) and the stability of seating on the valve seat can be achieved. However, the clearance in the axial direction and the radial direction causes an issue of vibration of the valving element 012 in response to the engine vibration, thereby causing abnormal noises. To take a measure against this, the disc spring 011 is provided to have a damping function against the vibration of the valving element 012.

In the structure shown in FIG. 12A where the disc plate 011 is arranged between the valving element and the lever 012, or the structure shown in FIG. 12B where the disc plate 011 is arranged between the lever 013 and the plate 014 disposed on an apposite side of the valving element 012, the disc plate 011 contacts a side of the lever 013 at a large diameter end P of the disc plate 011 and contacts the valving element 012 or the plate 014 at a small diameter end Q. By this, a bias force in the radial direction is applied by the disc spring 011. However, the large diameter end of the disc spring 011 interferes with unrestricted swing motion of the valving element 012, thereby making it difficult to achieve even seating of the valving element 012 on the valve seat.

Specifically, as shown in FIG. 12A and FIG. 12B, the large diameter end P of the disc spring 012 is disposed on the side of the lever 013 and the small diameter end Q is disposed on the side farther from the lever 013, i.e. the valving element 012 or the plate 014. For instance, spurring effect of the large diameter end P of the disc spring 011 suppresses the swing motion M of the valving element 012.

The spring force of the disc spring 012 of Patent Literature 2 may be weakened to achieve sufficient swing capability of the valving element with weaker spurring effect by the large diameter end P of the disc spring 012. However, this makes it difficult to achieve vibration-damping effect of the valving element.

In view of the above issues, it is an object of the present invention to provide a wastegate valve which can achieve even and stable seating of the valving element on the valve seat and which can suppress vibration of the valving element, as well as a exhaust gas turbocharger equipped with such wastegate valve.

Solution to Problem

To achieve the above object, a wastegate valve of one aspect of the present invention may include, but is not limited to:

a valving element which opens and closes an exhaust gas bypass path, the exhaust gas bypass path extracting a part of exhaust gas flow from an inlet side of an exhaust gas path of a turbine housing and feeding the part of the exhaust gas to an exhaust gas outlet path;

a valve stem which stands upright from the valving element;

an operating lever which has one end formed with an insertion hole where the valve stem is inserted with play and other end to which rotational force is applied;

a support plate which is provided on one end of the valve stem opposite to the other end which is inserted through the insertion hole; and a damping member which is provided between the support plate and the operating lever in an axial direction of the valve stem to suppress vibration of the valving element, wherein the damping member has a large-diameter part and at least two small-diameter parts with a diameter smaller than the large-diameter part in a space between the support plate and the operating lever in the axial direction, the large-diameter part and the at least two small-diameter parts being arranged concentrically with an axial center of the valve stem, and wherein a pair of the at least two small-diameter parts constitute a first contact part where the damping member contacts an operating lever side and a second contact part where the damping member contacts a support plate side respectively, the pair of the at least two small-diameter parts being respectively disposed at both ends of the damping member in the axial direction.

According to the one aspect of the present invention, the valve stem standing upright from the valving member is inserted in the insertion hole with play. This allows the valving element to move in the axial and radial directions of the valve stem with respect to the operating lever and thus, the valving element can move (swing) with respect to the operating lever. Therefore, the valving element can seat evenly and firmly on the seat surface, resulting in enhanced sealing performance.

Further, the damping member (the spring member) is provided between the support plate and the operating lever in the axial direction so as to suppress the vibration of the valving element with respect to the operating lever mainly in the axial direction of the valve stem and the first contact part where the damping member contacts the operating lever side and the second contact part where the damping member contacts the support plate side are respectively formed by the small-diameter parts. In other words, the damping member has the large-diameter part and the small-diameter parts with a diameter smaller than the large-diameter part in a space between the support plate and the operating lever in the axial direction, the large-diameter part and the small-diameter parts being arranged concentrically with an axial center of the valve stem. Therefore, the swinging of the valving element is not interfered by the contact parts of the damping member. The valving element can swing smoothly and can seat on the valve seat evenly and firmly. As a result, the seating capability and the sealing performance of the valving element are enhanced.

Even if the spring force of the damping member is made stronger to achieve higher vibration damping effect, the seating capability of the valving element on the valve seat can be maintained without compromising the swinging capability of the valving element. Thus, it is possible to improve the sealing performance by seating the valving element evenly and firmly on the valve seat and also to reduce noise by suppressing the vibration of the valving member.

In the above wastegate valve of the one aspect of the present invention, the damping member may be constituted of a plurality of disc springs stacked in the axial direction, each of said plurality of the disc springs having the large-diameter part and the small-diameter part, and the pair of the small-diameter parts may be placed at the both ends of the damping member in the axial direction to form the first and second contact parts.

By stacking a plurality of disc springs with the small-diameter part and the large-diameter part in the axial direction and arranging the small-diameter parts at the both ends of the damping member, the vibration damping effect of the valving element is enhanced while maintaining the swinging capability of the valving element.

In the above wastegate valve of the one aspect of the present invention, the damping member may be constituted of a pair of the disc springs stacked one on another in the axial direction of the valve stem such that the large diameter parts of the pair of the disc springs are joined together.

By stacking the pair of the disc springs one on another, it is not longer necessary to occupy a lot of space while still being able to attain the above swinging capability of the valving element and also to enhance the vibration damping effect of the valving element.

In the above wastegate valve of the one aspect of the present invention, the damping member may be formed by a single piece member having the large-diameter part and the at least two small-diameter parts in the axial direction.

With the single-piece structure of the damping member, i.e. a stack of spring members being formed integrally prior to assembling the damping member, it is now possible to improve the assembling efficiency.

In the above wastegate valve of the one aspect of the present invention, the single piece member of the damping member may include a washer provided between the support plate and the second contact part.

By including he washer in the single piece member of the damping member, it is possible to further enhance the assembling efficiency.

A wastegate valve of another aspect of the present invention, may include, but is not limited to:

a valving element which opens and closes an exhaust gas bypass path, the exhaust gas bypass path extracting a part of exhaust gas flow from an inlet side of an exhaust gas path of a turbine housing and feeding the part of the exhaust gas to an exhaust gas outlet path;

a valve stem which stands upright from the valving element;

an operating lever which has one end formed with an insertion hole where the valve stem is inserted with play and other end to which rotational force is applied;

a damping member which is provided between the valve stem and the operating lever in a radial direction to suppress vibration of the valving element, wherein the damping member is constituted of an elastic ring member which is arranged between an inner periphery of the insertion hole and the valve stem and which has a bias force acting in a diameter-expanding direction.

According to the another aspect of the present invention, the damping member is formed by the ring member which is interposed between the inner periphery of the insertion hole and the valve stem and which has the bias force in the diameter-expanding direction. Thus, in comparison to the case where the spring member is provided on a part of the valve stem extending above the operating lever, the damping member is provided inside the operating lever and thus, the whole wastegate valve can be downsized.

In the wastegate valve of the other aspect of the present invention, the elastic ring member may be arranged approximately in a central part of the insertion hole.

In this manner, the elastic ring member is arranged approximately in the central part of the insertion hole and thus, the valving element can seat on the valve seat evenly and firmly without blocking the swinging of the valve stem by arranging the elastic ring member at a center point of the swinging of the valve stem.

In the wastegate valve of the other aspect of the present invention, the valving element may be hollow. Thus, the weight of the valving element is reduced and the shock caused when the valving member seat on the valve seat can be reduced, thereby enhancing the vibration damping effect.

An exhaust gas turbocharger in relation to the present invention may include the wastegate valve which is described above. It is now possible to obtain the exhaust gas turbocharger which can produce the above effects of the wastegate valve.

Specifically, it is now possible to provide the exhaust gas turbocharger provided with the wastegate valve which has improved reliability and durability by achieving even and firm seating of the valving element on the valve seat as well as the vibration suppression of the valving member to prevent gas leak, vibration and abnormal noise caused by seating failure.

Advantageous Effects of Invention

According to the present invention, it is possible to a wastegate valve which can achieve even and stable seating of the valving element on the valve seat and which can suppress vibration of the valving element, as well as a exhaust gas turbocharger equipped with such wastegate valve.

DESCRIPTION OF EMBODIMENTS

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 1:
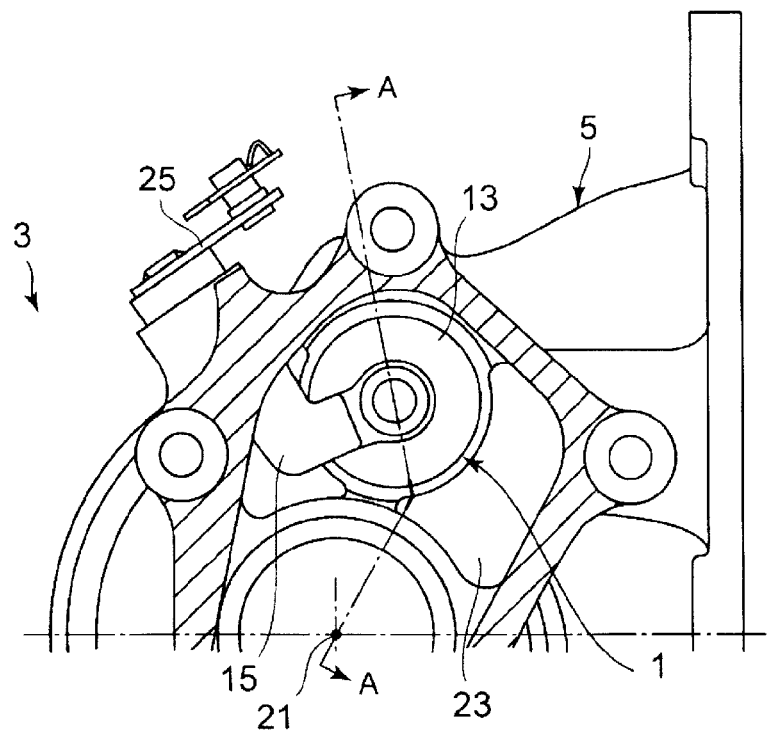
FIG. 1 is a partial sectional view of a turbocharger equipped with a wastegate valve in relation to the present invention, the sectional view taken in a direction perpendicular to a rotation axis of a turbine.

FIG. 1 is a partial sectional view of an exhaust gas turbocharger 3 (hereinafter described as a turbocharger) provided with a wastegate valve 1. The partial sectional view is taken in a direction perpendicular to a turbine rotation axis of the turbocharger 3. The turbocharger 3 is used as an example for having a twin-scroll exhaust gas path. However, this is not limitative and a single-scroll exhaust gas path may be used.

Figure 2:
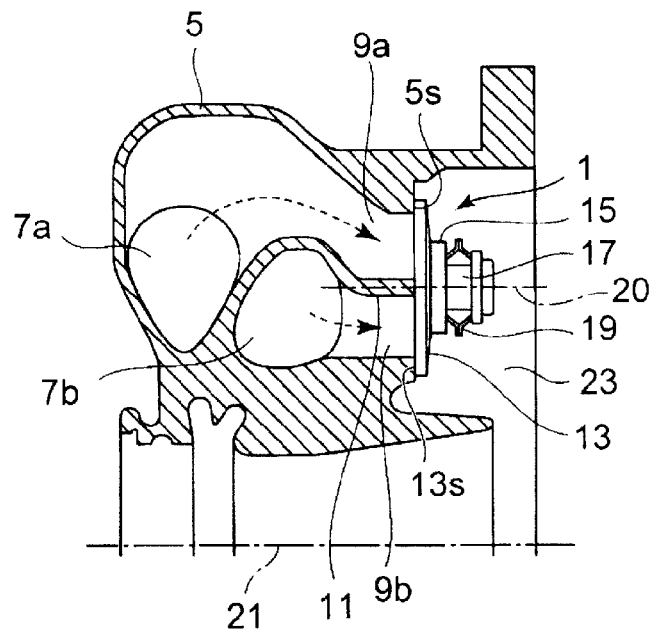
FIG. 2 is a cross-sectional view taken along a line A-A of FIG. 1.

As shown in FIG. 2, a pair of exhaust gas inlet paths 7a and 7b from which exhaust gas is fed to the turbine housing 5. The exhaust gas is fed to the turbine housing 5 and led to the turbine rotor (not shown).

Further, a pair of exhaust gas bypass paths 9a and 9b are formed branching from the pair of exhaust gas inlet paths 7a and 7b respectively. The pair of exhaust gas bypass paths 9a and 9b are partitioned by a partition wall 11 which is formed integrally with the turbine housing 5.

In FIG. 2, the wastegate valve 1 is provided in the exhaust gas bypass paths 9a and 9b to open and close the exhaust gas bypass paths 9a and 9b. The wastegate valve 1 includes a valving member 13 of a plate type which opens and closes the exhaust gas bypass path 9a and 9b, an operating lever 15 which is connected to the valving element 13, a valve stem 17 which is installed upright on the valving element 13, and a spring member 19 which is a damping member interposed between the valve stem 17 and the operating lever 15 to suppress vibration in the axial direction of the valve stem 17 with respect to the operating lever 15.

The exhaust gas bypass paths 9a and 9b are opened and closed by moving a seat surface 13s of the valving element 13 from or to a seat surface 5s of the turbine housing 5 facing openings of the exhaust gas bypass paths 9a and 9b via the operating lever 15 or the like.

FIG. 2 shows a centerline 20 of the wastegate valve 1 and a rotation center 21 of the turbine rotor of the turbocharger.

During the operation of the turbocharger 3, the exhaust gas enters the exhaust gas inlet paths 7a and 7b of twin scroll type, streaming through the exhaust gas path of scroll shape, being injected from a throat section of a turbine inlet exhaust gas path in a radial direction, acting on the turbine rotor in the radial direction to drive the turbine rotor and then being discharged to an exhaust pipe from an exhaust gas outlet path 23.

During a low speed operation when the function of the turbocharger 3 is not needed or during a high speed operation when a supercharging pressure becomes excessive, the valving element 13 is opened by a wastegate valve driving unit (not shown) via a connection arm 25, the operating lever 15 or the like. By this, a part of the exhaust gas flowing through the exhaust gas inlet paths 7a and 7b is fed to the exhaust gas bypass paths 9a and 9b and then discharged to the exhaust gas outlet path 23 to bypass the turbine rotor.

Suppression of the vibration and enhancement of sealing ability of the wastegate valve with the above structure is now explained.

First Embodiment

Figure 3:
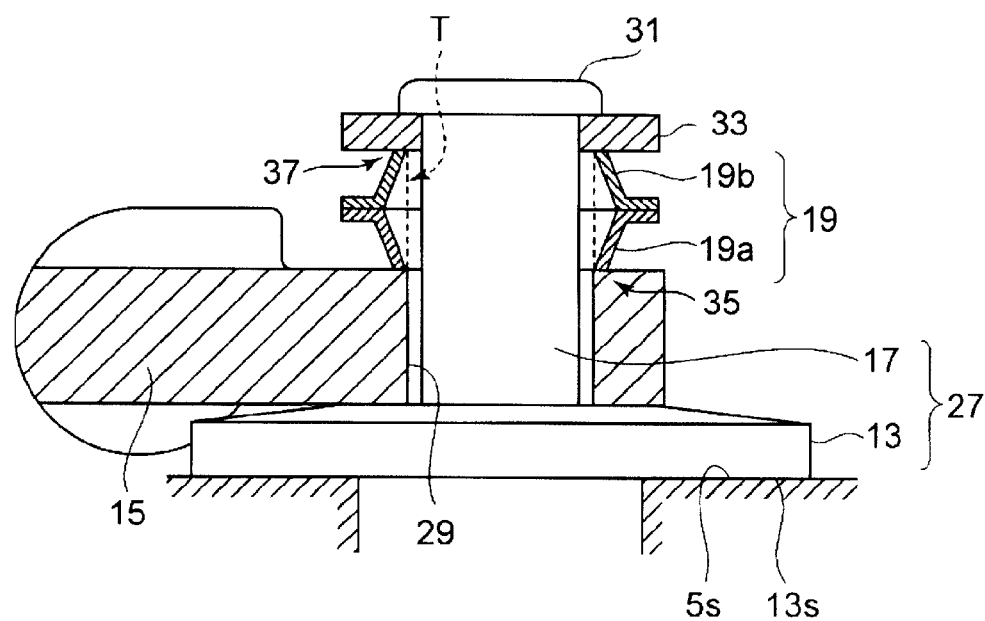
FIG. 3 is a cross-section view of a main part of a wastegate valve in relation to a first embodiment.

A first embodiment regarding the wastegate valve is illustrated in FIG. 3.

The valving element 13 is a plate-like member of approximately circular shape and includes a stem shaft 17 which is formed integrally with or fixed by welding, press-fitting or the like to a central part of the valving element 13 to form a valve body 27. The seat surface 13s of the valving element 13 is formed by a part around the circular valving element 13.

As described above, the seat surface 13s is placed to or removed from the seat surface 5s of the exhaust gas bypass paths 9a and 9b formed on the turbine housing side.

The operating lever 15 has one end formed with an insertion hole 29 where the valve stem 17 is inserted with play and other end which is connected to a drive source and to which rotational force is applied to turn the operating lever 15.

In this manner, the valve stem 17 is inserted in the insertion hole 29 with clearance and a support plate 31 is formed on one end of the valve stem 17 opposite to the other end to which the valving element 13 is formed. Between the support plate 31 and an upper surface of the operating lever 15, a washer 33 and the spring member (the damping member) 19 are supported.

Further, the spring member 19 is formed by stacking disc springs of almost coned-disc shape one on top of another. Specifically, a bottom disc spring 19a and a top spring part 19b are arranged in the axial direction of the valve stem 17 in such a manner that large diameter parts of the top and bottom spring parts 19a and 19b are joined together. A small diameter part of the bottom spring disc 19a contacts the upper surface of the operating lever 15 to constitute a first contact part 35 and a small diameter part of the top spring part 19b contacts a lower surface of the washer 33 to constitute a second contact part 37.

The first contact part 35 and the second contact part 37 are in a vicinity of an outer periphery of the valve stem 17 concentrically with the center line 20 of the valve 7 and have approximately the same diameter.

In this manner, the spring member 19 is provided within a space between the support plate 31 and the operating lever 15 in the axial direction of the valve stem 17. The spring member 19 has the large diameter part and the small diameter part with a diameter smaller than the large diameter art concentrically with the axial center of the valve stem 17. The first contact part 35 contacting the operating lever side and the second contact part 37 contacting the support plate side are formed by the small diameter parts.

The first contact part 35 contacting the operating lever 15 and the second contact part 37 contacting the water 33 are formed respectively by the small diameter parts that are disposed near the outer periphery of the valve stem 17. Thus, in comparison to the case of the related art where the large diameter part of the spring part contacts the operating lever 15 or the washer 33, the valve stem 17 can swing easily in the insertion hole 29.

Figure 4:
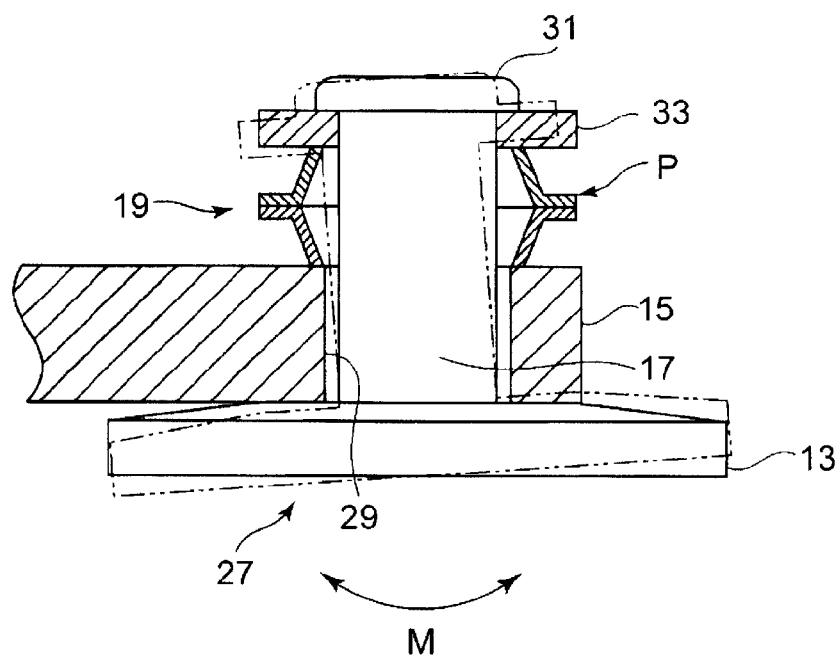
FIG. 4 illustrates a swing state of the valving element of the first embodiment.

As shown in FIG. 4, the edges P of the large diameter parts of the bottom spring part 19a and the top spring part 19b are not disposed on the operating lever side 15 and thus, the edge P of the large diameter part allows the valve body 13 to tilt without interfering with swinging motion M of the valving element 13 (shown with a dotted line in FIG. 4). As the swinging motion of the valving element 13 is not blocked by the spring member 19, the valving element 13 can swing smoothly and also seat evenly and firmly on the seat surface 5s. This improves seating capability of the valving element on the valve seat, resulting in enhanced sealing performance.

As shown in FIG. 3, the first contact part 35 and the second contact part 37 have approximately the same diameter and thus, the force acting on the operating lever 15 by the spring member 19 and the force acting on the valve stem 17 via the washer 33 by the spring member 19 are on the same diameter, in another words, on an aerial cylindrical plane T which is concentrically formed with the central line 21 of the valve 71.

Therefore, the valve stem 17 can be kept steady at a vertical position with respect to the operating lever 15 by the spring force without interfering with the swinging of the valving element 13 in the swinging state. Thus, the valving element 13 can be positioned firmly with respect to the seat surface 5s, resulting in improve sealing performance.

According to the first embodiment, the swinging of the valving element 13 is not blocked by the spring member 19 and thus, the valving element can swing smoothly and seat evenly and firmly on the seat surface 5s.

As a result, the seating capability of the valving element 13 is enhanced, thereby improving the sealing performance. Even if the spring force of the spring member 19 is made stronger to achieve higher vibration damping effect, the seating capability of the valving element 13 on the seat surface 5s can be maintained without compromising the swinging capability of the valving element 13.

Further, the first contact part 35 and the second contact part 37 form contact surfaces that have approximately the same diameter and thus, the spring force acts on the valve stem 17 in the axial direction in a stable manner. As a result, without increasing the spring force of the spring member 19, the stable spring force acts on the valve steam in the axial direction, resulting in stable seating of the valving element.

In this manner, it is possible to achieve even and firm seating of the valving element 13 on the seat surface 5s and also to suppress the vibration of the valving element 14.

The spring member 19 has a double-layer shape having two layers stacked one on top of the other as shown in FIG. 3 and FIG. 4. However, this is not limitative and the spring member 19 may have a multi-layer shape having a plurality of layers stacked one on top of another, or an accordion-like shape.

Second Embodiment

Figure 5:
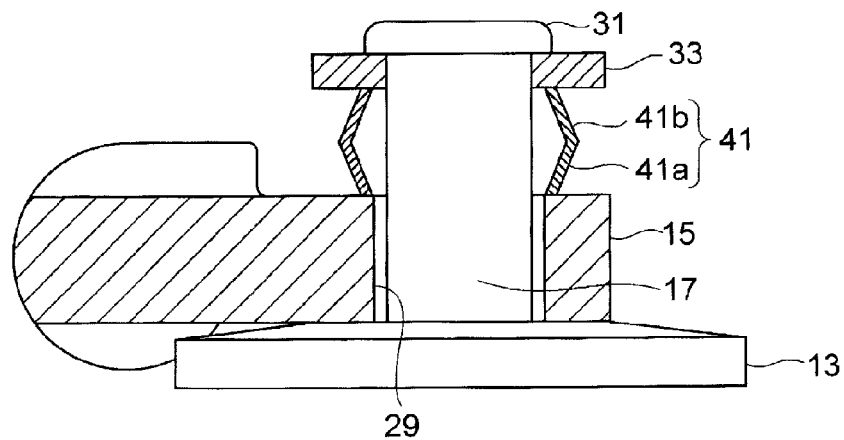
FIG. 5 is a cross-section view of a main part of a wastegate valve in relation to a second embodiment.

A second embodiment of the wastegate valve is explained in reference to FIG. 5.

The second embodiment is different from the first embodiment in that a single-piece spring member 41 is used, instead of the spring member 19 formed by the top spring part 19a and the bottom spring part 19b of the first embodiment. The rest of the structure is substantially the same as the first embodiment.

As shown in FIG. 5, the spring member 41 has small diameter parts forming contact surfaces at both ends thereof and has a large diameter part approximately at a midsection in a vertical direction. In this manner, the spring member 41 is a single piece constituted of the bottom part 19a and the top part 19b. Thus, the single-piece spring member 41 can be made in advance and then installed to facilitate assembling.

The assembling is performed in the following order. The valve stem 17 is joined to the valving element 13 in advance to produce the valve body 27, and then the valve stem 17 is inserted in the insertion hole 29, the spring member 41 being installed, the support plate 31 being fixed to one end of the valve stem 17 by press-fitting or welding.

Alternatively, the support plate 31 and the valve stem 17 may be fixed in advance and then, the spring member 41 is installed, the valve stem 17 being inserted in the insertion hole 29, the valving element 13 being fixed to the other end of the valve stem 17 by press-fitting or welding.

Third Embodiment

Figure 6:
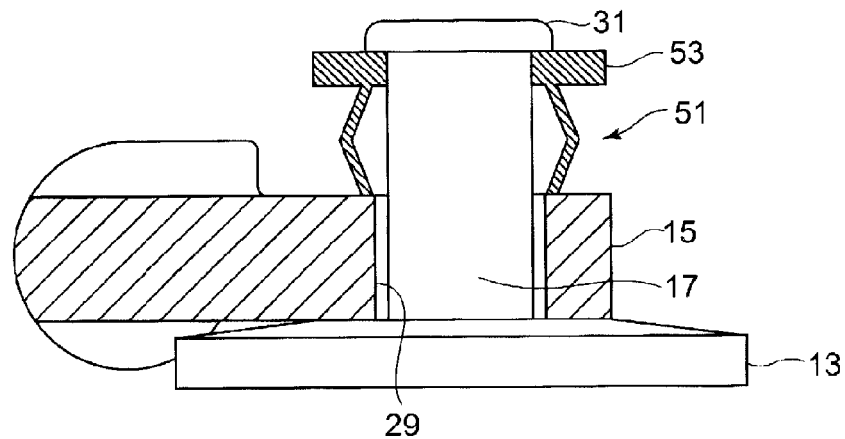
FIG. 6 is a cross-section view of a main part of a wastegate valve in relation to a third embodiment.

A third embodiment of the wastegate valve is explained in reference to FIG. 6.

In the third embodiment, a single-piece spring member 51 which also includes the washer 33 is used, instead of the single-piece spring member 41 of the second embodiment. The rest of the structure is substantially the same as the second embodiment.

As shown in FIG. 6, the spring member 51 has small diameter parts forming contact surfaces at both ends thereof and has a large diameter part approximately at a midsection in a vertical direction and further includes a washer part 53 formed integrally on a top end thereof.

In this manner, the spring member 51 is a single piece constituted of the bottom part 19a, the top part 19b and the washer part 53. Thus, the assembling of the spring member 51 is further facilitated and the same effects such as the vibration damping effect and the seating capability as the first embodiment are obtained.

Fourth Embodiment

Figure 7:
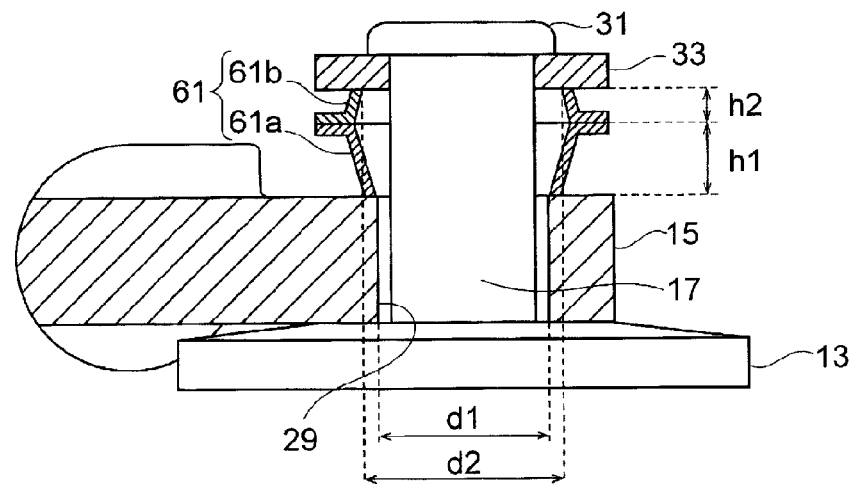
FIG. 7 is a cross-section view of a main part of a wastegate valve in relation to a fourth embodiment.

A fourth embodiment of the wastegate valve is explained in reference to FIG. 7.

The fourth embodiment is different from the first embodiment in that a spring member 61 is formed by a top spring part 61b and a bottom spring part 61a and the top and bottom spring parts 61b and 61a have different height h and different diameter d at small-diameter parts. The rest of the structure is substantially the same as the first embodiment.

As shown in FIG. 7, the height h2 of the top spring part 61b is smaller than the height h1 of the bottom spring part 61a, and the diameter d2 of the small-diameter part of the top spring part 61b is greater than the diameter d1 of the small-diameter part of the bottom spring part 61a. The top and bottom spring part 61b and 61a have approximately the same diameter at the large diameter parts to form a joint part.

In this manner, the diameter of the small-diameter part which contacts the operating lever 15 is made smaller than that of the small-diameter part which contacts the washer 33 to allow the valving member 13 to swing easily and to improve the seating capability of the valving member 13 on the seat surface 5s.

Of course, the top spring part 61b, the bottom spring part 61a and the washer 33 may be formed into a single piece in the same manner as the second and third embodiments. Further, the heights h and the diameters d of the small-diameter parts may be set arbitrarily in accordance with a relationship between the swinging capability of the valving element 13 and the position holding force with respect to the operating lever 15

Fifth Embodiment

Figure 8:
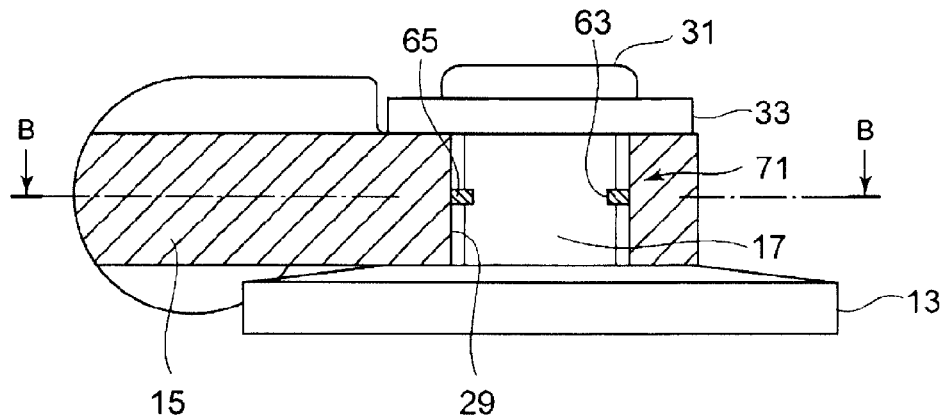
FIG. 8 is a cross-section view of a main part of a wastegate valve in relation to a fifth embodiment.

A fifth embodiment of the wastegate valve is explained in reference to FIG. 8.

In the fifth embodiment, a spring member 71 is inserted in the insertion hole 29 formed in the operating lever 15.

Figure 9:
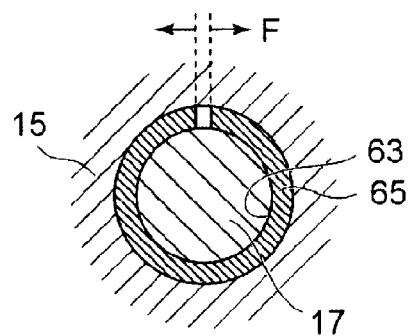
FIG. 9 is a cross-sectional view taken along a line B-B of FIG. 7.

As shown in FIG. 9, a ring member (an elastic ring member) 65 is provided in a groove 63 formed on an outer periphery of the valve stem 17. The ring member 65 has a bias force F acting in a diameter-expanding direction. Thus, the ring member 65 contacts an inner periphery of the insertion hole 29.

The ring member 65 contacts the inner periphery of the insertion hole 29 at the outer periphery to form a contact part (first contact part) on the operating lever side. The ring member 64 contacts a groove bottom of the groove 63 formed in the valve stem 17 at the inner periphery to form a contact art (second contact part) on the valve stem side.

The ring member 65 is arranged approximately in a midsection of the insertion hole 29 in a longitudinal direction. Although not shown, a length of the valve stem 17 between the washer 33 and the valving member 13 is set slightly greater than a depth of the insertion hole 29 so that the valve stem 17 is provided in the insertion hole 29 with clearance in the axial and radial directions and can swing within the insertion hole 29.

In this manner, the spring member 71 is formed by the ring member which is interposed between the inner periphery of the insertion hole 29 and the valve stem 17 and which has the bias force in the diameter-expanding direction. Thus, in comparison to the case where the spring member is provided on a part of the valve stem 17 extending above the operating lever 15, the whole wastegate valve can be downsized.

As the ring member 65 is arranged approximately in the midsection of the insertion hole 29 (in the height direction of FIG. 8), the ring member 65 is arranged at a center point of the swinging of the valve stem 17. Without blocking the swinging of the valve stem 17, it is possible to maintain an even seating capability of the valving element 13 on the seat surface 5s. Further, as for the vibration of the valve stem 17 in the axial direction, the outer periphery of the ring member 65 of the ring member 65 contacts the inner periphery of the insertion hole 29 to damp the vibration.

Sixth Embodiment

Figure 10:
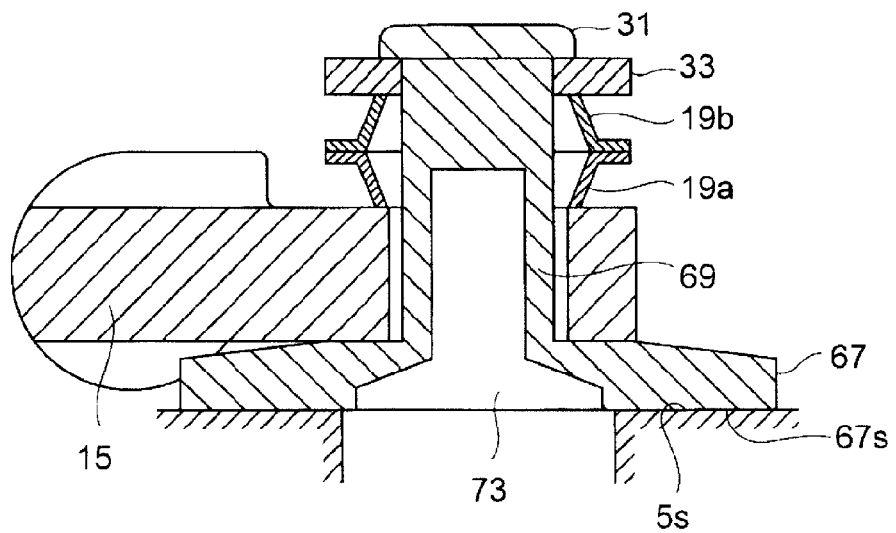
FIG. 10 is a cross-section view of a main part of a wastegate valve in relation to a sixth embodiment.
Figure 11:
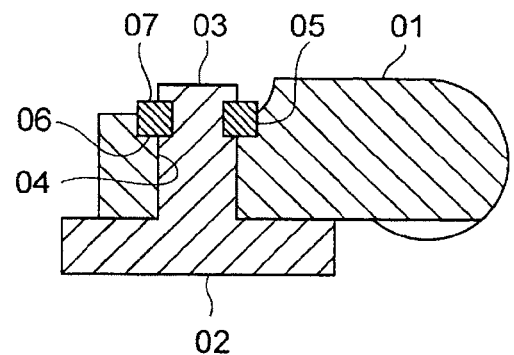
FIG. 11 is an explanatory illustration of related art.
Figure 12A:
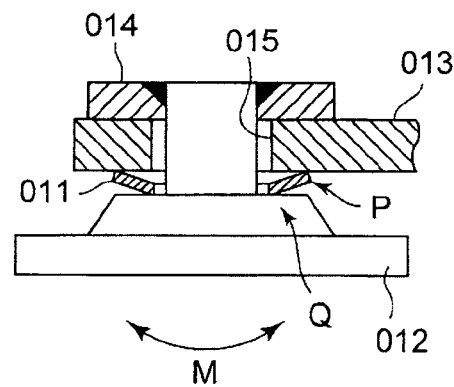
FIG. 12A is an explanatory illustration of the related art in which a disc spring is provided between a valving element and an operating lever.
Figure 12B:
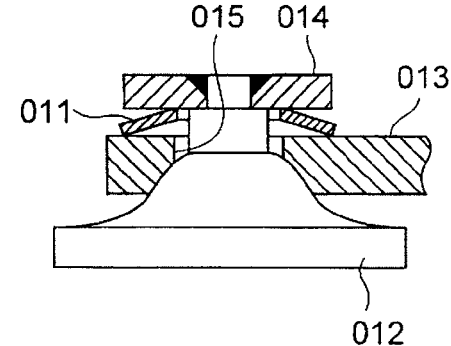
FIG. 12B is an explanatory illustration of the related art in which the disc spring is provided between the operating lever and a support plate disposed on an opposite side of the valving element.

A sixth embodiment of the wastegate valve is explained in reference to FIG. 10.

In the sixth embodiment, the valving element 13 and the valve stem 17 are hollow.

As shown in FIG. 10, the valve body has a hollow part 73 formed in a core part of the valving element 67 and a core part of the valve stem 69. The hollow part 73 of the valving element 67 is formed expect for a rim area which is a seat surface 67s of the circular valving member 67.

In this manner, the valving member 67 and the valve stem 69 have the hollow structure, thereby reducing a weight of the valve body 27. As a result, it is possible to absorb the shock caused when seating on the seat surface 5s, thereby reducing the vibration generated in the valving body 27 and enhancing the vibration damping effect.

While the present invention has been described with reference to exemplary embodiments, it is obvious to those skilled in the art that the first through sixth embodiments may be combined as desired and various changes may be made without departing from the scope of the invention. The spring member is not limited to stacked disc springs and may be any coned-disc shaped members stacked on top of another, or may be an accordion-shaped member as mentioned above.

INDUSTRIAL APPLICABILITY

The present invention can be preferably applied to a wastegate valve and an exhaust gas turbocharger equipped with the wastegate valve, which can achieve even and stable seating of the valving element on the valve seat and which can suppress vibration of the valving element.

REFERENCE NUMERALS

1 Wastegate valve
3 Turbocharger
5 Turbine housing
5s Seat surface on turbine housing side
7a, 7b Exhaust gas inlet path 9a, 9b Exhaust gas bypass path
13, 67 Valving element
13s, 67s Seat surface of the valving element
15 Operating lever
17, 69 Valve stem
19, 41, 51, 61, 71 Spring member (damping member)
23 Exhaust gas outlet path
31 Support plate
33 Washer
35 First contact part
37 Second contact part
65 Ring member (Elastic ring member)
73 Hollow part

The invention claimed is:

1. A wastegate valve comprising:
a valving element which opens and closes an exhaust gas bypass path, the exhaust gas bypass path extracting a part of exhaust gas flow from an inlet side of an exhaust gas path of a turbine housing and feeding the part of the exhaust gas flow to an exhaust gas outlet path;
a valve stem which stands upright from the valving element;
an operating lever which has one end formed with an insertion hole where the valve stem is inserted with play and another end to which rotational force is applied;
a support plate which is provided on one end of the valve stem opposite to another end which is inserted through the insertion hole; and
a damping member which is provided between the support plate and the operating lever in an axial direction of the valve stem to suppress vibration of the valving element,
wherein, in a space between the support plate and the operating lever in the axial direction, the damping member has:
a single large-diameter part with a largest diameter,
a first small-diameter part with a diameter smaller than the single large-diameter part, the first small-diameter part forming a first contact part where the damping member contacts a side of the operating lever, and
a second small-diameter part with a diameter smaller than the single large-diameter part, the second small-diameter part forming a second contact part where the damping member contacts a side of the support plate,
wherein the damping member is constituted so as to gradually increase a diameter of the damping member from each of the first small-diameter part and the second small-diameter part toward the single large-diameter part with the largest diameter, and
wherein the damping member includes,
a bottom spring part configured to gradually increase a diameter of the damping member from the first small-diameter part toward the single large-diameter part, and
a top spring part configured to gradually increase a diameter of the damping member from the second small-diameter part toward the single large-diameter part, each of the bottom spring part and the top spring part formed by a single member having a coned-disc shape and
wherein each of the bottom spring part and the top spring part includes a contiguous flange part formed on an outer periphery of the large-diameter part, both of the flange parts of the bottom spring part and the top spring part being joined together.

2. The wastegate valve according to claim 1, wherein the bottom spring part and the top spring part are stacked one on another in the axial direction of the valve stem such that the bottom spring part and the top spring part are joined together.

3. The wastegate valve according to claim 1, wherein the damping member is formed by a single piece member integrated with the bottom spring part and the top spring part.

4. The wastegate valve according to claim 3, wherein the single piece member of the damping member includes a washer provided between the support plate and the second contact part, the washer being integrated with the single piece member.

5. The wastegate valve according to claim 1, wherein the valving element is hollow.

6. An exhaust gas turbocharger, comprising: the wastegate valve of claim 1.

7. A wastegate valve comprising:
a valving element which opens and closes an exhaust gas bypass path, the exhaust gas bypass path extracting a part of exhaust gas flow from an inlet side of an exhaust gas path of a turbine housing and feeding the part of the exhaust gas to an exhaust gas outlet path;
a valve stem which stands upright from the valving element;
an operating lever which has one end formed with an insertion hole where the valve stem is inserted with play and other end to which rotational force is applied;
a damping member which is provided between the valve stem and the operating lever in a radial direction to suppress vibration of the valving element, wherein the damping member is constituted of an elastic ring member which is arranged between an inner periphery of the insertion hole and the valve stem and which has a bias force acting in a diameter-expanding direction, wherein an outer periphery of the elastic ring member is configured to contact the inner periphery of the insertion hole, and wherein an inner periphery of the elastic ring member is configured to contact an outer periphery of the valve stem.

8. The wastegate valve according to claim 7, wherein the elastic ring member is arranged approximately in a central part of the insertion hole.

* * * * *